(12) United States Patent
Nash et al.

(10) Patent No.: US 12,131,243 B2
(45) Date of Patent: Oct. 29, 2024

(54) AUTOREGRESSIVE NEURAL NETWORKS FOR THE GENERATION OF POLYGONAL MESHES OF 3D OBJECTS

(71) Applicant: DeepMind Technologies Limited, London (GB)

(72) Inventors: Charlie Thomas Curtis Nash, London (GB); Iaroslav Ganin, Montreal (CA); Seyed Mohammadali Eslami, London (GB); Peter William Battaglia, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 17/798,108

(22) PCT Filed: Feb. 8, 2021

(86) PCT No.: PCT/EP2021/052984
§ 371 (c)(1),
(2) Date: Aug. 8, 2022

(87) PCT Pub. No.: WO2021/156514
PCT Pub. Date: Aug. 12, 2021

(65) Prior Publication Data
US 2023/0076437 A1    Mar. 9, 2023

Related U.S. Application Data

(60) Provisional application No. 62/971,858, filed on Feb. 7, 2020.

(51) Int. Cl.
*G06N 3/02* (2006.01)
*G06T 17/20* (2006.01)
*G06N 3/047* (2023.01)

(52) U.S. Cl.
CPC ............. *G06N 3/02* (2013.01); *G06T 17/205* (2013.01); *G06N 3/047* (2023.01)

(58) Field of Classification Search
CPC ......... G06N 3/02; G06N 3/047; G06T 17/205
See application file for complete search history.

(56) References Cited

U.S. PATENT DOCUMENTS

| | | | | |
|---|---|---|---|---|
| 2012/0019517 A1* | 1/2012 | Corazza | ................... | G06T 17/20 345/419 |
| 2019/0130267 A1* | 5/2019 | Norouzi | ................. | G06N 3/006 |

(Continued)

FOREIGN PATENT DOCUMENTS

| | | |
|---|---|---|
| JP | 2006318232 | 11/2006 |
| JP | 2011243016 | 12/2011 |
| WO | WO 2019/084551 | 5/2019 |

OTHER PUBLICATIONS

Yongbin Sun, "PointGrow: Autoregressively Learned Point Cloud Generation with Self-Attention" 2019, arXiv, pp. 1-10 (Year: 2019).*

(Continued)

*Primary Examiner* — Terrell M Robinson
(74) *Attorney, Agent, or Firm* — Fish & Richardson P.C.

(57) ABSTRACT

Methods, systems, and apparatus, including computer programs encoded on computer storage media, for generating data specifying a three-dimensional mesh of an object using an auto-regressive neural network.

24 Claims, 5 Drawing Sheets

(56) References Cited

U.S. PATENT DOCUMENTS

| | | | |
|---|---|---|---|
| 2020/0027269 A1 | 1/2020 | Jiang et al. | |
| 2020/0342316 A1* | 10/2020 | Shazeer | G06N 3/044 |
| 2020/0372710 A1* | 11/2020 | Wang | B33Y 50/00 |
| 2020/0410344 A1* | 12/2020 | Kaiser | G06N 3/084 |
| 2022/0237869 A1* | 7/2022 | Takeda | G06N 3/08 |

OTHER PUBLICATIONS

Chaudhuri et al., "Probabilistic reasoning for assembly-based 3D modeling," ACM Trans. Graph., Aug. 2011, 30(4):35.

Child et al., "Generating long sequences with sparse transformers," CoRR, Apr. 23, 2019, arxiv.org/abs/1904.10509, 10 pages.

Choy et al., "3D-R2N2: A unified approach for single and multiview 3D object reconstruction," Computer Vision—ECCV 2016, Sep. 17, 2016, 9912:628-644.

Devlin et al., "BERT: Pre-training of Deep Bidirectional Transformers for Language Understanding," CoRR, Oct. 11, 2018, arXiv:1810.04805, 16 pages.

Groueix et al., "A papier-mache approach to learning 3D surface generation," Proceedings of the IEEE Conference on Computer Vision and Pattern Recognition (CVPR), 2018, pp. 216-224.

Holtzman et al., "The curious case of neural text degeneration," CoRR, Apr. 22, 2019, arxiv.org/abs/1904.09751, 16 pages.

International Preliminary Report on Patentability in International Appln. No. PCT/EP2021/052984, Jul. 28, 2022, 12 pages.

International Search Report and Written Opinion in International Appln. No. PCT/EP2021/052984, Jun. 1, 2021, 14 pages.

Kalogerakis et al., "A probabilistic model for component-based shape synthesis," ACM Trans. Graph., Jul. 1, 2012, 31(4):55:1-11.

Mescheder et al., "Occupancy networks: Learning 3D reconstruction in function space," Proceedings of the IEEE/CVF Conference on Computer Vision and Pattern Recognition (CVPR), 2019, pp. 4460-4470.

Nash et al., "PolyGen: An Autoregressive Generative Model of 3D Meshes," CoRR, Feb. 23, 2020, arxiv.org/abs/2002.10880, 16 pages.

Office Action in Korean Appln. No. 10-2022-7030381, dated Sep. 19, 2023, 13 pages (with English translation).

Parisotto et al., "Stabilizing transformers for reinforcement learning," Proceedings of the 37th International Conference on Machine Learning, 2020, 119:7487-7498.

Radford et al., "Language models are unsupervised multitask learners," OpenAI Blog, Feb. 25, 2019, 1(8):9.

Raffel et al., "Exploring the Limits of Transfer Learning with a Unified Text-to-Text Transformer," CoRR, Oct. 23, 2019, arXiv:1910.10683, 67 pages.

Smelik et al., "A survey on procedural modelling for virtual worlds," Comput. Graph. Forum, Jan. 15, 2014, 33(6):31-50.

Sun et al., "PointGrow: Autoregressively Learned Point Cloud Generation withSelf-Attention," Proceedings of the IEEE/CVF Winter Conference on Applications of Computer Vision (WACV), 2020, pp. 61-70.

Triebe et al., "AR-Net: A simple Auto-Regressive Neural Network for time-series," CoRR, Nov. 27, 2019, arxiv.org/abs/1911.12436, 12 pages.

Van den Oord et al., "Pixel recurrent neural networks," Proceedings of The 33rd International Conference on Machine Learning, 2016, 48:1747-1756.

Van den Oord et al., "Wavenet: A generative model for raw audio," CoRR, Sep. 12, 2016, arxiv.org/abs/1609.03499, 15 pages.

Vaswani et al., "Attention Is All You Need," CoRR, Jun. 12, 2017, arXiv:1706.03762, 15 pages.

Vinyals et al., "Pointer networks," Advances in Neural Information Processing Systems 28 (NIPS 2015), 2015, pp. 2692-2700.

Zhang et al., "Identity mappings in deep residual networks," European Conference on Computer Vision, Sep. 17, 2016, 9908:630-645.

Allowance of Patent in Korean Appln. No. 10-2022-7030381, dated Jan. 29, 2024, 5 pages.

Office Action in Japanese Appln. No. 2022-548004, dated Dec. 18, 2023, 9 pages.

Decision to Grant Patent in Japanese Appln. No. 2022-548004, dated Apr. 8, 2024, 5 pages.

\* cited by examiner

AUTOREGRESSIVE NEURAL NETWORKS FOR THE GENERATION OF POLYGONAL MESHES OF 3D OBJECTS

CROSS-REFERENCE TO RELATED APPLICATION

This application is a National Stage Application under 35 U.S.C. § 371 and claims the benefit of International Application No. PCT/EP2021/052984, filed Feb. 8, 2021, which claims priority to U.S. Application No. 62/971,858, filed Feb. 7, 2020, the disclosure of which is incorporated herein by reference.

BACKGROUND

This specification relates to generating a three-dimensional mesh of an object using a neural network.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system of one or more computers in one or more physical locations that uses an auto-regressive mesh generation neural network to generate a three-dimensional (3D) mesh, i.e., to generate an output sequence that specifies vertices and faces of a three-dimensional mesh, of an object.

Particular embodiments of the subject matter described in this specification can be implemented so as to realize one or more of the following advantages.

Conventional approaches to using neural networks to generate representations of objects have generated 3D objects using alternative representations of object shape, e.g., voxels, point clouds, occupancy functions, and surfaces. In these conventional approaches, mesh reconstruction is left as a post-processing step and the resulting meshes are of varying quality at best. The described techniques, on the other hand, directly generate a 3D mesh using an auto-regressive neural network and effectively account for the unordered elements and discrete face structures that are present in meshes. This results in meshes that are diverse and have realistic geometry and that are directly usable in a variety of graphics applications.

Additionally, the generated meshes can be effectively conditioned on any of a variety of context inputs, allowing the system to effectively generate meshes that have realistic geometries but are also of a particular type of object that is characterized by the context input.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
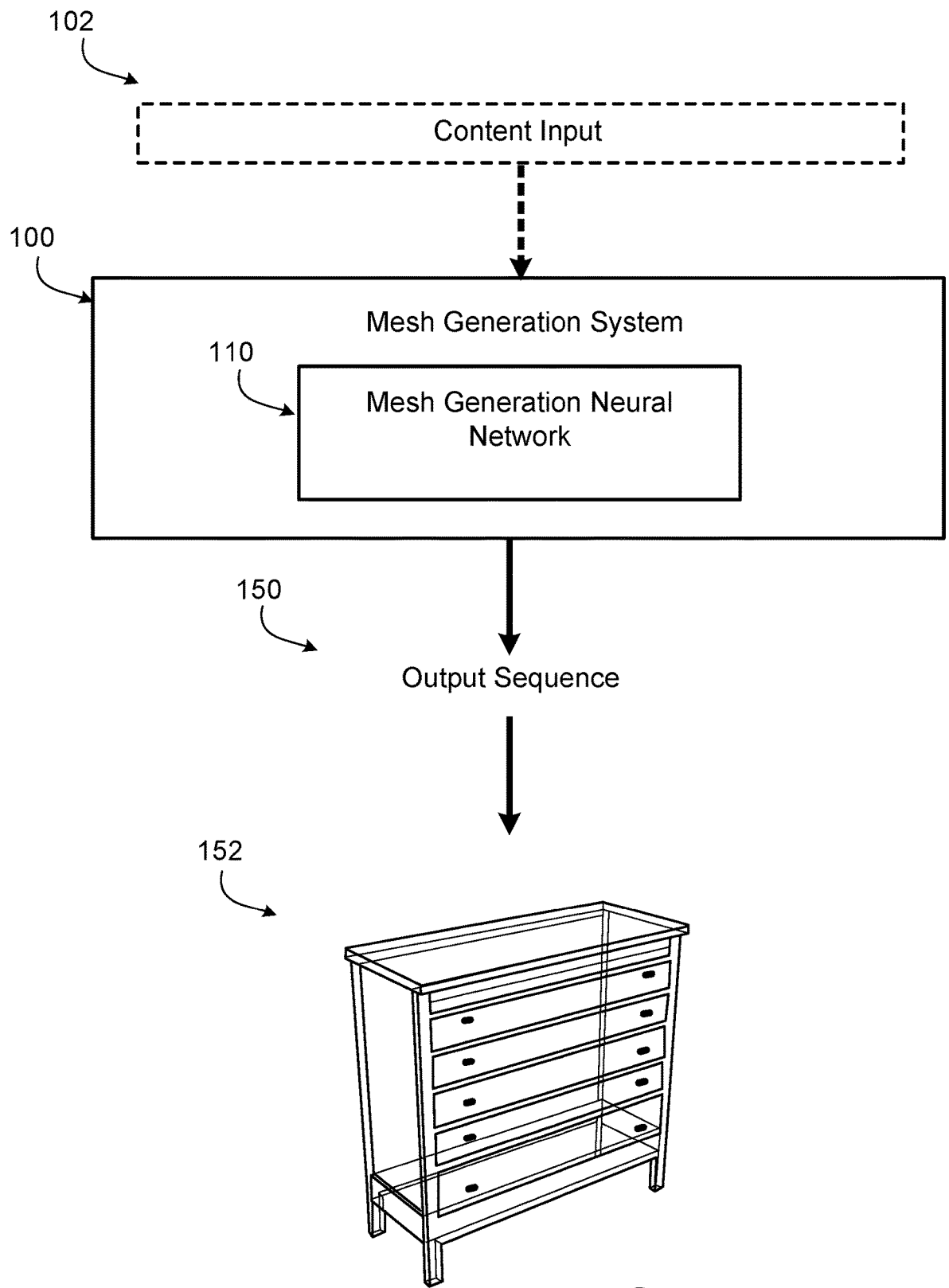
FIG. 1 shows an example mesh generation system.

This specification describes a system of one or more computers in one or more physical locations that uses an auto-regressive mesh generation neural network to generate a three-dimensional mesh, i.e., to generate an output sequence that specifies vertices and faces of a three-dimensional mesh of an object.

For example, the mesh generation neural network can include a vertex generation neural network that generates a first sequence that includes vertex coordinates of the vertices of the mesh and a face generation neural network that generates a second sequence that includes mesh tokens that identify which vertices make up each of the faces of the mesh.

Because the mesh generation neural network is auto-regressive, the mesh generation neural network can be used to generate many different but high quality meshes given the same context input by sampling from the probability distributions generated by the neural network at each output position.

Once the output sequence has been generated, the system can generate and render the mesh or can provide the sequence to another system for mesh generation and rendering. For example, the system can generate one or more meshes from any given context input and can provide the generated meshes for presentation to a user, e.g., as candidates for insertion into a video game, a virtual reality scene, a movie, or another virtual world. As another example, the generated meshes can be used as an output of a computer vision system or inserted into a virtual environment being interacted with by a robot, e.g., as part of learning a control policy for the robot.

Accordingly, one or more other neural networks may be trained based on an output mesh. For instance, a computer vision neural network may be trained to recognize a shape of an output mesh. Alternatively, an agent may be trained to perform a task on the object represented by the output mesh within a virtual environment. This may include positioning the output mesh within a virtual environment and instructing a reinforcement learning agent to perform actions on the object represented by the output mesh to perform a task. The reinforcement learning agent may be trained based on rewards received in response to actions taken in the virtual environment.

A generated mesh may be used for rendering an image including the object (for instance an image of the object or an image of the object within a scene such as a virtual environment). The rendering process may produce a two dimensional (2D) image representing a view of a three dimensional (3D) scene including the object. This process may assign a position of the object within the environment. This may be part of a virtual reality or augmented reality rendering process. Accordingly, the position and/or orientation of the view (e.g. the field of view) of the environment may be dependent on a position and/or orientation of a view (e.g. the field of view) of a physical (real-world) environment (e.g. based on position and/or orientation measurements from one or more sensors, such as one or more sensors within a virtual reality or augmented reality headset).

One or more generated meshes may be directly integrated into a computer graphics engine (e.g. a graphics processor unit, GPU). These can be used by the computer graphics engine to render images of a virtual environment, as discussed above. The computer graphics engine may store the one or more generated meshes and access them when one or more objects represented by the one or more generated meshes are required to be rendered (e.g. where the one or more objects form part of the virtual environment). Deformations may be applied to the stored meshes as part of the rendering process (e.g. to reflect changes in the structure of the object being rendered). The meshes may be used for ray tracing. For instance, ray tracing may be rendering where virtual rays of light are modelled within a virtual environment and wherein reflections off an object represented by a particular mesh are modelled as part of the rendering process. This may include identifying intersections between a ray and a mesh and shading the intersections based on properties of the object.

As a further example, a generated mesh may be output to one or more (additive) manufacturing devices for manufacturing one or more objects having the shape described by the generated mesh. This output might include slicing the mesh and/or converting the mesh into a format suitable for manufacturing (e.g. via additive manufacturing). This format may be a set of instructions (e.g. G-code) that, when executed by the one or more manufacturing devices, cause the one or more manufacturing devices to manufacture the one or more objects. The set of instructions may be computer-readable instructions. The converting of the mesh into the format for manufacturing may be based on user preferences, such as layer thickness in the case of additive manufacturing.

FIG. 1 shows an example mesh generation system 100. The mesh generation system 100 is an example of a system implemented as computer programs on one or more computers in one or more locations, in which the systems, components, and techniques described below can be implemented.

The mesh generation system 100 is a system that generates an output sequence 150 that specifies a three-dimensional mesh 152 of an object using an auto-regressive mesh generation neural network 110.

A three-dimensional mesh of a three-dimensional object is a collection of vertices and polygon faces that define the shape of the three-dimensional object.

In some cases, the polygon faces all have the same size, i.e., the same number of vertices. As a particular example, all of the polygon faces can be triangles that have three vertices.

In some other cases, the faces can have a variable size, i.e., a variable number of vertices. Allowing the faces to have different numbers of vertices can result in a more compact representation of the object, i.e., a representation that has fewer faces. For example, any large flat surfaces of the object can be represented as a single face with many vertices instead of as a collection of multiple triangles.

In this specification, the system 100 is described as being configured to generate meshes that are made up of polygon faces with variable numbers of vertices. However, it will be understood that the system 100 could also instead be configured to restrict the number of vertices in each face in the mesh so that each face has the same number of vertices.

In some implementations, the system 100 performs unconditional mesh generation, i.e., generates the output sequence 150 without explicit conditioning on an input. In these cases, the system 100 will generate realistic meshes that are representative of the meshes that appeared in training data used to train the auto-regressive mesh neural network 110.

In some other implementations, the system 100 performs conditional mesh generation. In these cases, the system 100 receives a context input 102 that specifies a context for the mesh to be generated and generates a realistic mesh of an object characterized by the context input 102 using the neural network 110.

The system 100 can be configured to receive any of a variety of context inputs.

As one example, the context input can be an input identifying an object class for the object, i.e., an input that specifies the object class to which the object that the generated mesh represents should belong.

As another example, the context input can be an image of the object, i.e., an input that is an image of the object that the generated mesh should represent.

As another example, the context input can be a voxelized representation of the object, i.e., a set of voxels representing the object that the generated mesh should represent.

Performing conditional mesh generation, i.e., how to condition the neural network 110 on the context input 102, is described in more detail below with reference to FIGS. 3-5.

Generally, the output sequence 150 generated by the system 100 represents the vertices and faces of the three-dimensional mesh 152 of the object. In particular, the output sequence can include a first sub-sequence that includes vertex coordinates of the vertices of the mesh followed by a second sub-sequence that includes mesh tokens that identify which vertices make up each of the faces of the mesh.

Once the output sequence 150 has been generated, the system 100 can generate and render the mesh 152 or can provide the sequence 150 to another system for mesh generation and rendering. For example, the system 100 can generate one or more meshes from any given context input 102 and can provide the generated meshes for presentation to a user, e.g., as candidates for insertion into a video game, a virtual reality scene, a movie, or another virtual world. As another example, the generated meshes can be used as an output of a computer vision system or inserted into a virtual environment being interacted with by a robot, e.g., as part of learning a control policy for the robot.

Accordingly, one or more other neural networks may be trained based on an output mesh. For instance, a computer vision neural network may be trained to recognize a shape of an output mesh. Alternatively, an agent may be trained to perform a task on the object represented by the output mesh within a virtual environment. This may include positioning the output mesh within a virtual environment and instructing a reinforcement learning agent to perform actions on the object represented by the output mesh to perform a task. The reinforcement learning agent may be trained based on rewards received in response to actions taken in the virtual environment.

A generated mesh may be used for rendering an image including the object (for instance an image of the object or an image of the object within a scene such as a virtual environment). The rendering process may produce a two dimensional (2D) image representing a view of a three dimensional (3D) scene including the object. This process may assign a position of the object within the environment. This may be part of a virtual reality or augmented reality rendering process. Accordingly, the position and/or orientation of the view (e.g. the field of view) of the environment may be dependent on a position and/or orientation of a view (e.g. the field of view) of a physical (real-world) environment (e.g. based on position and/or orientation measurements from one or more sensors, such as one or more sensors within a virtual reality or augmented reality headset).

One or more generated meshes may be directly integrated into a computer graphics engine (e.g. a graphics processor unit, GPU). These can be used by the computer graphics engine to render images of a virtual environment, as discussed above. The computer graphics engine may store the one or more generated meshes and access them when one or more objects represented by the one or more generated meshes are required to be rendered (e.g. where the one or more objects form part of the virtual environment). Deformations may be applied to the stored meshes as part of the rendering process (e.g. to reflect changes in the structure of the object being rendered). The meshes may be used for ray tracing. For instance, ray tracing may be rendering where virtual rays of light are modelled within a virtual environment and wherein reflections off an object represented by a particular mesh are modelled as part of the rendering process. This may include identifying intersections between a ray and a mesh and shading the intersections based on properties of the object.

As a further example, a generated mesh may be output to one or more (additive) manufacturing devices for manufacturing one or more objects having the shape described by the generated mesh. This output might include slicing the mesh and/or converting the mesh into a format suitable for manufacturing (e.g. via additive manufacturing). This format may be a set of instructions (e.g. G-code) that, when executed by the one or more manufacturing devices, cause the one or more manufacturing devices to manufacture the one or more objects. The set of instructions may be computer-readable instructions. The converting of the mesh into the format for manufacturing may be based on user preferences, such as layer thickness in the case of additive manufacturing.

The output sequence 150 includes a respective mesh token at each of multiple output positions within the output sequence 150. The system 100 uses the auto-regressive mesh generation neural network 110 to generate the mesh tokens in an auto-regressive manner, i.e., by generating the mesh tokens one by one, with the generation of the mesh token at any given position being conditioned on the mesh tokens that have already been generated at any earlier output positions in the output sequence 150. Depending on the output position, the mesh tokens can include any of: values for coordinates of the vertices of the mesh, identifiers for vertices of the mesh, a stop token, or a new face token. Each of these will be described in more detail below.

In other words, at any given output position, the system 100 generates the mesh token at the given output position by processing an input for the given output position using the auto-regressive mesh generation neural network 110 to generate a probability distribution over possible mesh tokens for the given output position, with the neural network 110 being conditioned on (at least) any mesh tokens that have already been selected at any earlier output positions in the output sequence.

The system 100 then selects, using the probability distribution, the mesh token at the output position from the possible mesh tokens for the output position.

How the system 100 generates the input for the given output position and which tokens are possible mesh tokens for the given output position depends on where in the output sequence 150 the given output position is located.

In particular, as will be described in more detail below, the system 100 first generates mesh tokens that represent the coordinates of the vertices of the polygon faces in the mesh and then generates mesh tokens that identify which vertices make up each of the multiple faces in the mesh.

Thus, the output sequence 150 includes a first set of output positions followed by a second set of output positions. The mesh tokens at the first set of output positions represent the coordinates of the mesh vertices and the mesh tokens at the second set of output positions identify vertices that make up each of the multiple faces.

In other words, the system 100 factors the joint distribution over vertices and faces into a product of conditional distributions, one over possible vertex coordinates (with every vertex coordinate conditioned on already selected coordinates) and one over face vertices (with each face vertex conditioned on already selected face vertices).

To generate data defining a mesh, i.e., to generate the output sequence 150, the system first samples the vertices from the vertex distribution and then samples the faces from a face distribution that is conditional on the sampled vertices.

This will be described in more detail below with reference to FIG. 2.

Figure 2:
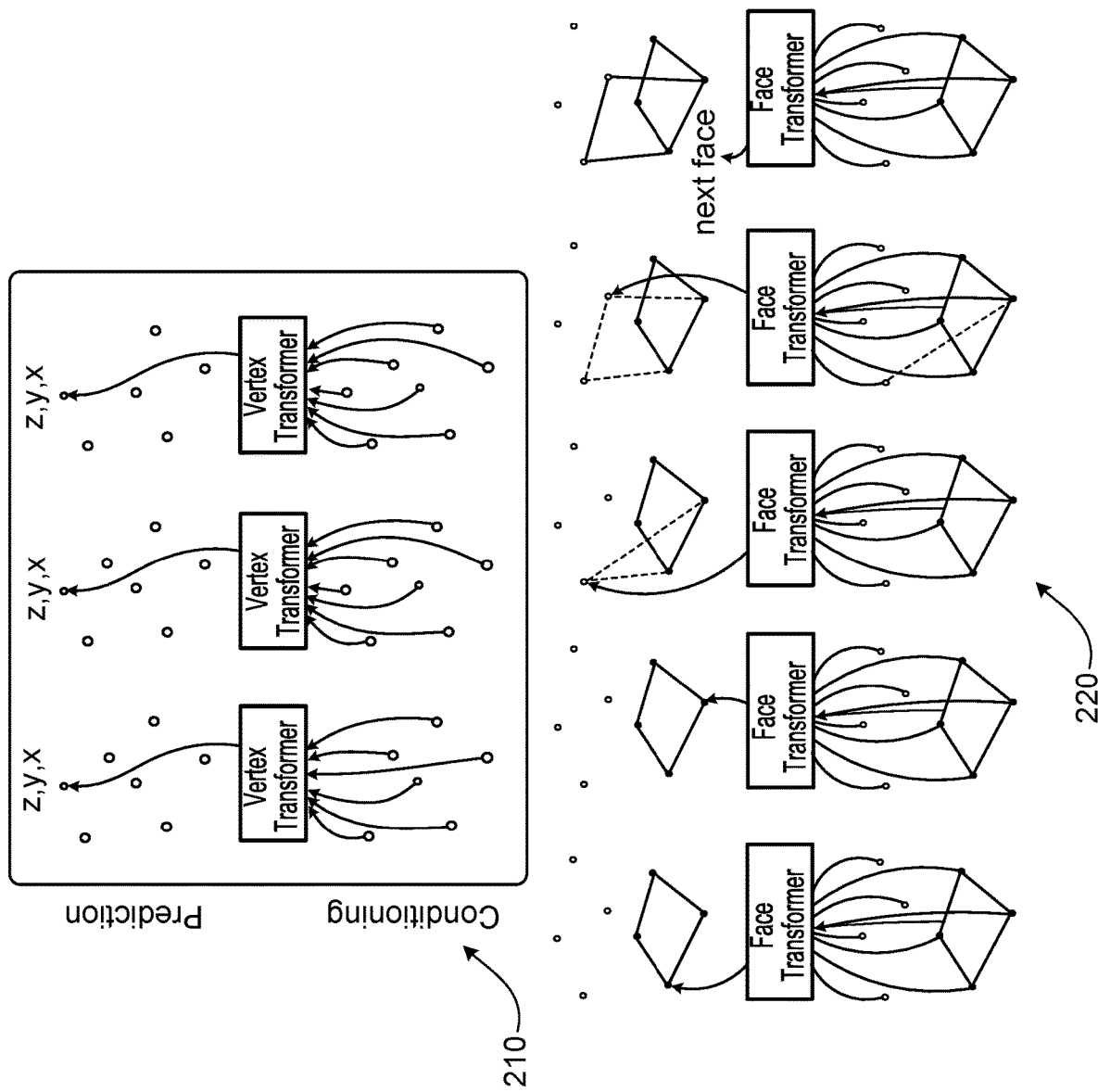
FIG. 2 shows an example of the operation of the mesh generation neural network.

FIG. 2 shows an example of the operation of the auto-regressive mesh generation neural network 110.

In the example of FIG. 2, the neural network 110 includes a vertex generation neural network 210 and a face generation neural network 220.

As shown in FIG. 2, the system first generates the mesh vertices using the vertex generation neural network and then generates the mesh faces conditioned on the generated vertices. In the example of FIG. 2, the vertex generation neural network 210 is shown generating the z, y, and x coordinates of a vertex at three output positions.

To generate a given mesh vertex, the system generates the x, y, and z coordinates of the vertex in a three-dimensional coordinate system, where z is the vertical axis.

More specifically, the system generates the vertex coordinates as a flattened sequence of concatenated tuples of values, with each tuple representing the three coordinates of a different one of the mesh vertices. As a particular example, within each tuple, the three values can represent the (z, y, x) coordinates of the mesh, in that order.

Thus, the output sequence 150 includes a first set of output positions that specify the coordinates of the vertices of the mesh. That is, each output position in the first set corresponds to either the z, y, or x coordinate of one of the vertices of the mesh.

In particular, to generate the coordinate at any given output position in the first subset, the system processes a sequence of the already generated coordinates at output positions before the given output position using the vertex generation neural network.

The vertex generation neural network includes a vertex decoder (referred to as a "vertex Transformer" in the Figure) that generates a respective embedding of each of the already generated coordinates and a vertex decoder that processes the sequence of embeddings to generate a probability distribution over possible values for the coordinate at the given output position. This can equivalently be referred to as generating the embeddings using a vertex encoder and then processing the sequence of embeddings using a vertex decoder.

An embedding, as used in this specification, is a numeric representation of a token. In particular, an embedding is a numeric representation in an embedding space, i.e., an ordered collection of a fixed number of numeric values, where the number of numeric values is equal to the dimensionality of the embedding space. For example, the embedding can be a vector of floating point or other type of numeric values.

For example, the system can quantize the space of possible coordinate values and, for each output position in the first set, the vertex decoder can generate a probability distribution, i.e., a Categorical distribution, over the quantized coordinate values in the resulting quantized set. The system then selects the mesh token, i.e., the coordinate value, for the given output position using the probability distribution. This is described in more detail below with reference to FIG. 4.

In some implementations, the system applies masking to the logits that are output by the vertex generation neural network to mask out any mesh tokens that are invalid for the given output position. This is also described below with reference to FIG. 4.

The vertex encoder can generate the embedding of a given coordinate value in any of a variety of ways. As a particular example, the embedding can be a combination, e.g., a concatenation, a sum, or an average, of two or more of (1) a coordinate embedding, that indicates whether the input token is an x, y, or z coordinate, (2) a position embedding, that indicates which vertex in the sequence the token belongs to, or (3) a value embedding, which expresses a token's quantized coordinate value. Embeddings (1) (2) and (3) can either be pre-determined or learned jointly with the training of the vertex generation neural network.

In some implementations, rather than generating mesh tokens that represent individual coordinates for vertices, i.e., where each token represents only one of an x, y, or z coordinate, the system can instead generate mesh tokens that each represent all three coordinates of a given vertex, i.e., each tuple can represent an entire tuple of coordinates for a single vertex. For example, the system can use a mixture of discretized logits to model probability distributions over the three coordinates of a vertex.

Once the sequence of vertex coordinates, i.e., the mesh tokens at the first subset of positions in the output sequence 150, has been generated, the system uses the face generation neural network 220 to generate data specifying the faces in the three-dimensional mesh of the object. The example of FIG. 2 shows the neural network 220 generating four mesh tokens that identify the four vertices that make up a rectangular face of the resulting mesh.

Each face is defined ("made up by") three or more of the vertices that are specified by the first subset of positions in the output sequence 150. In particular, the system uses the face generation neural network to generate the mesh tokens at the second subset of output positions in the output sequence 150. Each mesh token at one of the positions in the second subset either (i) identifies one of the vertices generated by the vertex generation neural network or (ii) is a new face token that indicates that the previous face is complete and that a new face will be starting with the next mesh token at the next output position.

Thus, once the mesh tokens at the second subset of output positions have been generated, the faces in the mesh are (i) a first face that is made up of the vertices that are identified by the mesh tokens before the first new face token in the second subset, (ii) the respective faces that are made up of the mesh tokens that are at positions in between any two new face tokens in the second subset, and (iii) a last face that is made up of the vertices that are identified by the mesh tokens that are after the last new face token in the output sequence.

To generate the mesh tokens at the second subset, the face generation neural network includes a face encoder that generates a respective contextual embedding of a set of inputs that is made up of (i) each of the plurality of vertices that are specified by the outputs of the vertex generation neural network, (ii) the new face token, and (iii) a stopping token.

The face generation neural network also includes a face decoder that auto-regressively generates the mesh tokens at the second subset of positions that define the faces conditioned on the respective contextual embeddings of the set of inputs.

Generating the contextual embeddings and the mesh tokens in the second subset are described below with reference to FIG. 5.

The system (or another system) trains the auto-regressive mesh generation neural network on training data that includes training output sequences specifying meshes in a training data set and, in cases where the system performs conditional mesh generation, a respective context input for each training output sequence.

In particular, when the auto-regressive mesh generation neural network includes the vertex generation neural network and the face generation neural network, the system can train the vertex generation neural network to optimize one objective function that measures and the probabilities assigned to ground truth vertex coordinates in the training output sequences by the vertex generation neural network. The system also trains the face generation neural network to optimize a second objective function that measures probabilities assigned to the faces specified by the ground truth output sequences by the face generation neural network (conditioned on ground truth vertices from the ground truth training sequences).

As a particular example, the system can train the vertex generation neural network by maximizing a log-likelihood objective that measures the log likelihood assigned to the ground truth vertex coordinates in a given ground truth output sequence by the probability distributions generated by the vertex generation neural network at the corresponding positions in the first subset of output positions.

As another particular example, the system can train the face generation neural network by maximizing a log-likelihood objective that measures the log likelihood assigned to the ground truth vertices in a given ground truth output sequence by the probability distributions at the corresponding positions in the second subset of output positions.

Figure 3:
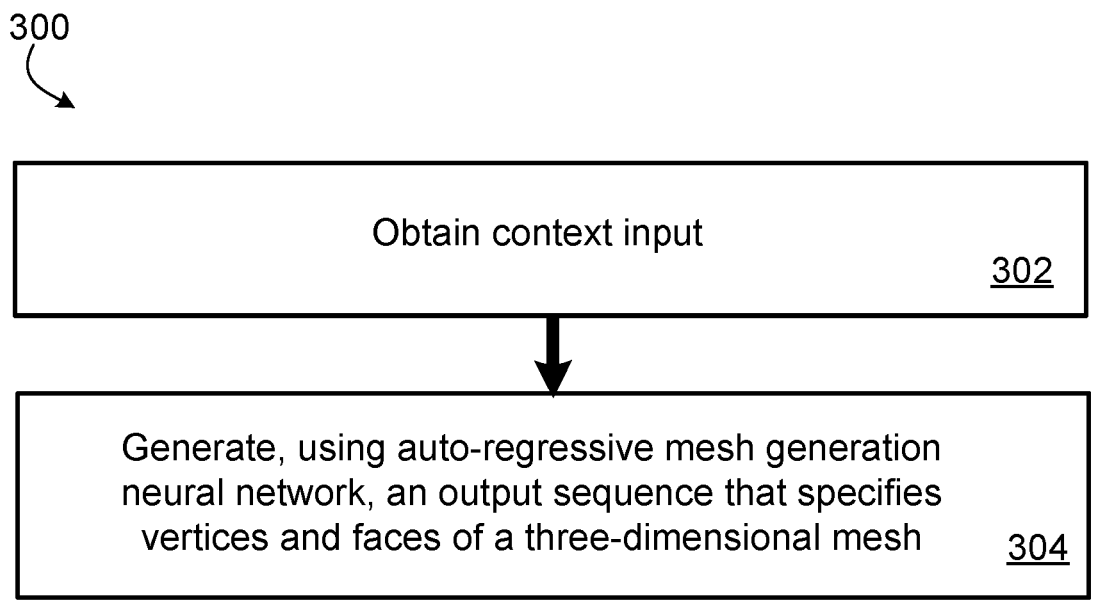
FIG. 3 is a flow diagram of an example process for generating an output sequence that specifies a mesh.

FIG. 3 is a flow diagram of an example process 300 for generating an output sequence that defines a three-dimensional mesh. For convenience, the process 300 will be described as being performed by a system of one or more computers located in one or more locations. For example, a mesh generation system, e.g., the mesh generation system 100 of FIG. 1, appropriately programmed, can perform the process 300.

Optionally, the system obtains a context input (step 302). In particular, as described above, the system can either perform unconditional mesh generation, in which the system generates a realistic mesh that is not conditioned on any input, or can perform conditional mesh generation, in which the system generates a realistic mesh of an object characterized by a context input.

The system generates, using an auto-regressive mesh generation neural network, an output sequence that specifies vertices and faces of a three-dimensional mesh of an object (step 304).

The output sequence includes a respective mesh token at each of a plurality of output positions and the system generates the mesh tokens in sequence, i.e., one by one.

To generate the mesh token at a given output position the system processes an input for the time step using the auto-regressive mesh generation neural network, with the neural network conditioned on at least any mesh tokens that have already been selected at any earlier output positions, to generate a probability distribution over possible mesh tokens for the given output position. The possible mesh tokens will generally vary for different output positions in the output sequence. When a context input has been obtained, the auto-regressive mesh generation neural network is also conditioned on the context input for at least some of the output positions.

As a particular example, the output sequence can include a first set of output positions followed by a second set of output positions. The mesh tokens at the first set of output positions can be respective coordinates of each of a plurality of vertices of the mesh, i.e., each mesh token at one of the first output positions is a coordinate of one of the vertices of the mesh. The mesh tokens at the second set of output positions identify vertices from the plurality of vertices that make up each of a plurality of faces of the mesh, i.e., each mesh token at one of the second output positions identifies a respective vertex of one of the faces of the mesh.

Generating probability distributions for positions in the first set of output positions is described below with reference to FIG. 4.

Generating probability distributions for positions in the second set of output positions is described below with reference to FIG. 5.

The system then selects, using the probability distribution, the mesh token at the output position from the possible mesh tokens for the given output position. For example, the system can select the possible mesh token that has the highest probability or sample a mesh token from the probability distribution.

When the system is configured to sample from the probability distributions, the system can generate multiple different realistic meshes given the same context input due to the auto-regressive nature of the computation.

Figure 4:
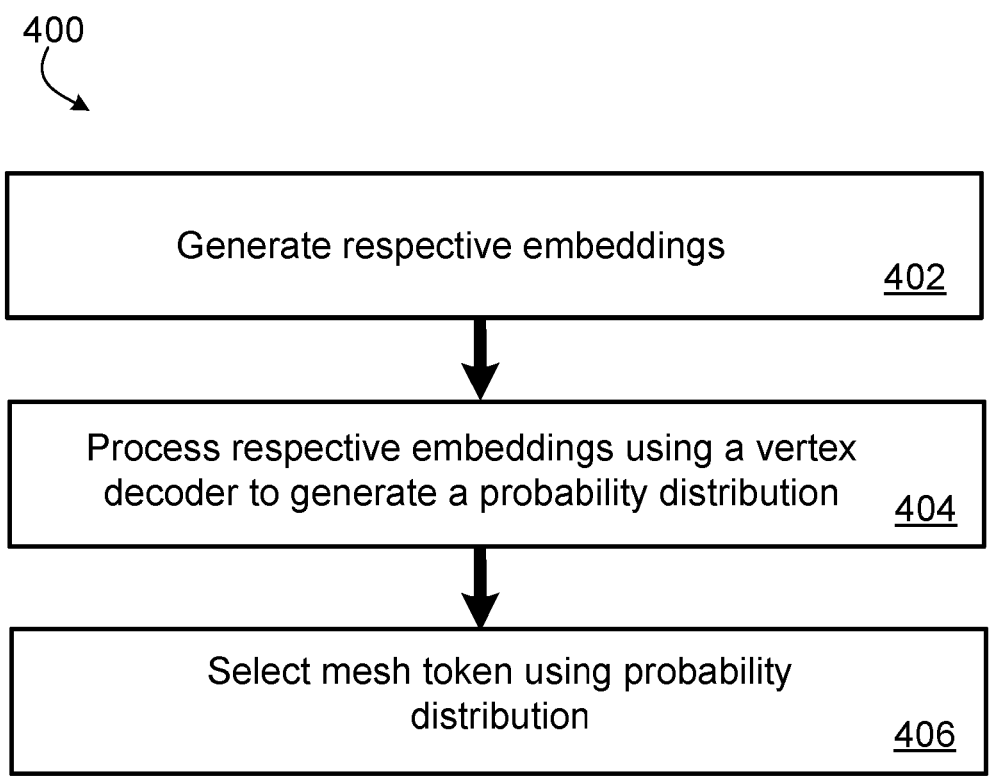
FIG. 4 is a flow diagram of an example process for generating the vertices of the mesh.

FIG. 4 is a flow diagram of an example process 400 for generating a mesh token at a given output position in the first subset of output positions. For convenience, the process 400 will be described as being performed by a system of one or more computers located in one or more locations. For example, a mesh generation system, e.g., the mesh generation system 100 of FIG. 1, appropriately programmed, can perform the process 400.

The system can repeatedly perform the process 400 to generate the respective coordinates of all of the vertices of all of the vertices of the mesh. Because the meshes generated by the system will generally have a variable number of vertices, the system can repeatedly perform the process 400 until a stopping criterion is satisfied.

For example, the system can repeatedly perform the process 400 to add coordinates to the first subset of output positions until the system selects a pre-determined stop token. Once the pre-determined stop token has been selected, the system treats the mesh tokens selected before the stop token as the tokens at the first subset of output positions.

The system generates a respective embedding for any vertex coordinates that have already been selected at any earlier output positions in the output sequence (step 402). In particular, the system can generate the respective embeddings by processing the embedding using the vertex encoder as described above with reference to FIG. 2.

The system processes the respective embeddings using a vertex decoder to generate a probability distribution for the given output position (step 404).

As a particular example, the vertex decoder can be a neural network that has a Transformer architecture, i.e., can have the architecture of the decoder in a Transformer.

A Transformer is a neural network that repeatedly applies an attention mechanism over its inputs as part of generating an output. Transformers can include both an encoder and a decoder, only an encoder, or only an encoder, depending on the configuration of the Transformer. Examples of configurations of Transformers and the specifics of the components of Transformers, e.g., attention layers, feed-forward layers within the layers of the attention network, and the output layers of the attention neural network that generate the network outputs, are described in more detail in Vaswani, et al, Attention Is All You Need, arXiv:1706.03762, Raffel, et al, Exploring the Limits of Transfer Learning with a Unified Text-to-Text Transformer, arXiv:1910.10683, and Devlin et al, BERT: Pre-training of Deep Bidirectional Transformers for Language Understanding, arXiv:1810.04805, the entire contents of which are hereby incorporated by reference herein in their entirety.

Generally, the output of the vertex decoder includes a respective logit, i.e., a respective score, for all of the possible coordinates and for the stop token. In some implementations, the system then applies a softmax to the respective logits to generate the probability distribution.

In some other implementations, the system first masks out logits for any possible mesh tokens for the output position that are not valid given the mesh tokens that have been selected at earlier positions in the first subset and then, after the masking, applies the softmax to generate the probability distribution. Masking out a logit for a mesh token refers to setting the logit to a value, e.g., negative infinity, such that, when processed by a softmax, the resulting probability for the mesh token is zero (and that the mesh token is therefore not selected by the system when sampling from the distribution or when selecting the highest probability in the distribution).

For example, the system can mask out the logit for the stop token unless the preceding coordinate is the last coordinate of a vertex, e.g., a x-coordinate of a vertex when the tuples are ordered (z, y, x), i.e., so that the system does not stop generating coordinates while the coordinates for the last vertex are only partially generated.

As another example, the system can impose additional requirements on the generation of the vertices and then, at some or all of the output positions, mask out logits to ensure that those requirements are satisfied.

As a particular example, the system can impose a requirement on the order in which the vertices should be generated based on a location of a specified one of the three coordinates of the vertices. When generating the specified coordinate for each of the vertices, the system can mask out logits for those values of the specified coordinate that would violate the imposed requirement on the order.

For example, the system can require that the z-coordinates of the vertices increase monotonically, i.e., that the vertex with the smallest z-coordinate value is generated first and the z-coordinates of the vertices increase monotonically from there on. In this example, when generating the z-coordinates of any vertex other than the first vertex, the system can mask out logits for any possible coordinate values that are equal to or smaller than the value of the z coordinate of the preceding vertex (or equivalently, any possible coordinate values that are not larger than all of the z coordinate values for all of the preceding vertices).

The system selects the mesh token at the output position using the probability distribution, e.g., by sampling a mesh token from the probability distribution (step 406). As described above, if the system samples or selects the stop token, the system identifies the already generated vertices as the only vertices in the mesh.

Figure 5:
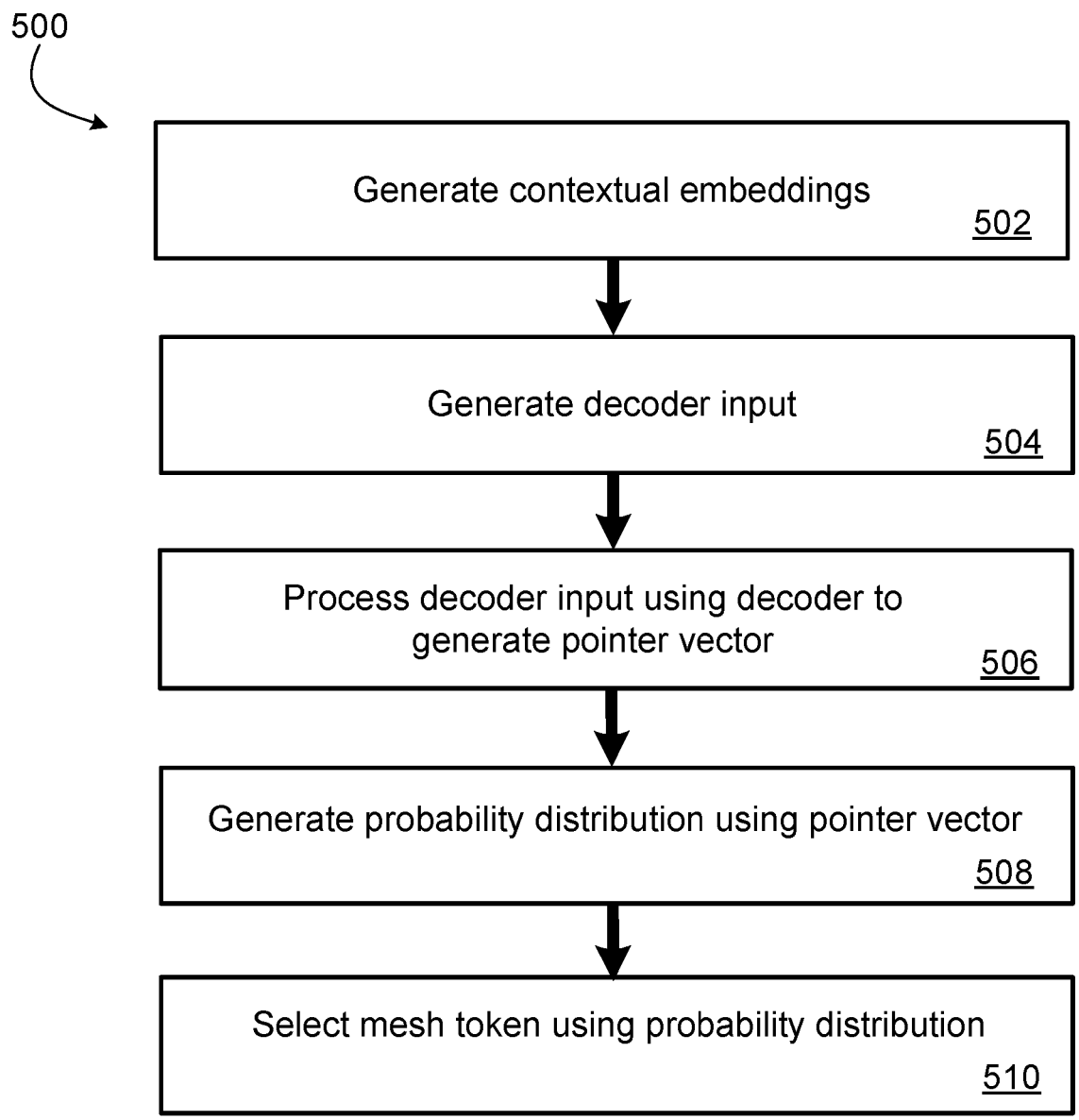
FIG. 5 is a flow diagram of an example process for generating the faces of the mesh.

FIG. 5 is a flow diagram of an example process 500 for generating the mesh tokens at the output positions in the second subset of output positions. For convenience, the process 500 will be described as being performed by a system of one or more computers located in one or more locations. For example, a mesh generation system, e.g., the mesh generation system 100 of FIG. 1, appropriately programmed, can perform the process 500.

The system generates a respective contextual embedding of a set of inputs that is made up of (i) each of the plurality of vertices, (ii) a new face token, and (iii) a stopping token (step 502). The embeddings are referred to as "contextual" embeddings because the embedding for any given input in the set depends on the values of the other inputs in the set.

To generate the respective contextual embeddings, the system processes (i) each of the plurality of vertices, (ii) a new face token, and (iii) the stopping token using a face encoder. As described above, the new face token is a designated token that, when selected, indicates that the current face is complete and that the following mesh token will indicate a next vertex in a new face.

The face encoder is a neural network that is configured to process an input sequence to generate a respective embedding of each of the inputs in the sequence. As a particular example, the face encoder can be a neural network that has a Transformer architecture, i.e., can have the architecture of the encoder in a Transformer.

The system can then repeatedly perform steps 504-510 to generate the faces of the three-dimensional mesh, i.e., to identify, for each face of the three-dimensional mesh, the vertices that make up the face. Because the meshes generated by the system will generally have a variable number of faces, the system can repeatedly perform steps 504-510 until a stopping criterion is satisfied.

For example, the system can repeatedly perform the steps 504-510 to identify face vertices until the system selects the stopping token. Once the stopping token has been selected, the system treats the faces that have been defined by the mesh tokens selected before the stopping token as the faces of the mesh.

In other words, the system performs steps 504-510 for each output position in the second set of output positions to select the mesh token at the output position.

In particular, to select the mesh token at a given output position in the second set of output positions, the system generates a decoder input for the given output position that includes a respective embedding of each mesh token that has been generated at any earlier output positions in the second set (step 504). In particular, the system generates a sequence of the respective embeddings of the mesh tokens.

The system can compute the embedding of a given mesh token in any of a variety of ways. As a particular example, the system can generate one or more embeddings that characterize the location of the vertex identified by the mesh token within the mesh and then combine, e.g., concatenate, average, or sum, these embeddings with the contextual embedding for the mesh token. The embeddings that characterize the location of the vertex can include an embedding of an identifier for the face that the vertex belongs, an embedding of a location of the vertex within the face, or both. The embeddings can be either pre-determined or learned jointly with the training of the neural network.

The system processes the decoder input using a face decoder to generate a pointer vector (step 506). The pointer vector is a vector having the same dimensionality as the contextual embeddings.

The face decoder is a neural network that is configured to process a sequence of inputs and to generate as output a vector. As a particular example, the face decoder can have a Transformer architecture, i.e., can have a masked Transformer decoder architecture and the pointer vector can be the output embedding for the last embedding in the decoder input that is generated by the Transformer decoder.

In some implementations, each attention layer within the masked Transformer decoder applies only masked self-attention over the decoder input. In some other implementations, to allow for additional conditioning on the vertices, the masked Transformer decoder also includes one or more attention layers that apply cross-attention into the contextual embeddings of the vertices.

The system generates, from the pointer vector and the respective contextual embeddings of (i) each of the plurality of vertices, (ii) the new face token, and (iii) the stopping token, a probability distribution over (i) each of the plurality of vertices, (ii) the new face token, and (iii) the stopping token (step 508).

In particular, for each contextual embedding, the system computes a dot product between the contextual embedding and the pointer vector to generate a logit.

In some implementations, the system then applies a softmax over the logits to generate the probability distribution.

In some implementations, the system masks out logits for any possible mesh tokens for the output position that are not valid given the mesh tokens that have been selected at earlier positions and then applies the softmax to generate the probability distribution. For example, the system can mask out the logit for the stop token until each vertex has been included in at least one face. As another example, within a given face, the system can mask out the logits for the vertices that have already been included as part of the face.

The system selects the mesh token at the given position using the probability distribution, e.g., by sampling from the probability distribution (step 510).

As described above, in some implementations the system receives a context input and conditions the generated output sequence on the received context input.

The system can implement this conditioning in any of a variety of ways, but generally, for at least some of the output positions in the output sequence, the system generates the mesh token at the output sequence with the mesh generation neural network conditioned on the context input.

Some specific examples of conditioning the mesh generation neural network on a context input follow.

As described above, in some implementations the context input is a global feature that describes the entire mesh, e.g., an identifier for an object class of the object. In these implementations, the system can generate a learned embedding of the object class and, if necessary, project the embedding to the same dimensionality as the embeddings that are operated on by the vertex generation and the face generation neural network. The system can then combine the embedding with the outputs of some or all of the hidden layers of the neural networks. As a particular example, when the vertex generation and face generation neural networks have Transformer architectures, the system can combine the embedding with the intermediate representations following the self-attention layer in each block of the Transformers.

In some other implementations, the context input is a high-dimensional input like an image or a set of voxels. For high-dimensional context inputs, the system jointly trains, i.e., jointly with the mesh-generation neural network, a domain-appropriate encoder that outputs a sequence of context embeddings for the context input.

The vertex decoder, the face decoder, or both can then be conditioned on the sequence of context embeddings. In particular, the vertex decoder, the face decoder, or both can include one or more attention layers that apply cross-attention into the sequence of context embeddings.

In particular, when the context input is an image of the object, the system processes the image using an image encoder neural network to generate a sequence of image embeddings and conditions the mesh generation neural network on the sequence of image embeddings as above. As a particular example, the image encoder neural network can be a two-dimensional convolutional neural network made up of a series of downsampling residual blocks.

Similarly, when the context input is a set of voxels representing the object, the system processes the voxels using voxel encoder neural network to generate a sequence of voxel embeddings and conditions the mesh generation neural network on the sequence of voxel embeddings as above. As a particular example, the voxel encoder neural network can be a three-dimensional convolutional neural network made up of a series of downsampling residual blocks.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method performed by one or more computers, the method comprising:
   generating, using an auto-regressive mesh generation neural network, an output sequence that specifies vertices and faces of a three-dimensional mesh of an object, the output sequence comprising a respective mesh token at each of a plurality of output positions, wherein:
   the output sequence comprises a first set of output positions followed by a second set of output positions, the mesh tokens at each of the first set of the output positions are respective coordinates of each of a plurality of vertices of the mesh, the mesh tokens at the second set of output positions are respective coordinates of each of a plurality of faces of the mesh, and wherein the generating comprises, at each of the first set of output positions:
processing an input for the output position in the first set of output positions using the auto-regressive mesh generation neural network conditioned on at least coordinates of any of the plurality of vertices of the mesh that correspond to mesh tokens that have already been selected at any earlier output positions to generate a probability distribution over possible mesh tokens for the output position, and selecting, using the probability distribution, the mesh token at the output position in the first set of output positions from the possible mesh tokens for the output position; and at each of the second set of output positions:
processing an input for the output position in the second set of output positions using the auto-regressive mesh generation neural network conditioned on at least (i) the respective coordinates of each of the plurality of vertices of the mesh corresponding to the mesh tokens at the first set of output positions and (ii) respective coordinates of any faces that correspond to any mesh tokens that have already been selected at any earlier output positions in the second set of output positions to generate a probability distribution over possible mesh tokens for the output position, and selecting, using the probability distribution, the mesh token at the output position in the second set of output positions from the possible mesh tokens for the output position.

2. The method of claim 1, further comprising:
generating, from the output sequence, the three-dimensional mesh of the object.

3. The method of claim 1, wherein selecting, using the probability distribution, the mesh token at the output position comprises:
sampling a mesh token from the probability distribution.

4. The method of claim 1, wherein the auto-regressive mesh generation neural network comprises a vertex generation neural network that includes a vertex decoder, and wherein the generating comprises, for each output position in the first set of output positions:
generating a respective embedding for any vertex coordinates that have already been selected at any earlier output positions using a vertex encoder; and
processing the respective embedding using the vertex decoder to generate the probability distribution.

5. The method of claim 4, wherein the vertex decoder is an attention-based decoder neural network.

6. The method of claim 5, wherein the vertex decoder comprises a plurality of self-attention neural network layers.

7. The method of claim 1, wherein the generating comprises generating vertex coordinates until the selected mesh token is a pre-determined stopping token that indicates that generation is terminated.

8. The method of claim 1, wherein the auto-regressive mesh generation neural network comprises a face decoder, and wherein the generating comprises:
generating a respective contextual embedding of (i) each of the plurality of vertices, (ii) a new face token, and (iii) a stopping token, wherein the new face token indicates that a face has been completed and the stopping token indicates that generation is terminated; and at each of the second set of output positions:
generating a decoder input that includes a respective embedding of each mesh token that has been generated at any earlier output positions in the second set;
processing the decoder input using the face decoder to generate a pointer vector; and
generating, from the pointer vector and the respective contextual embeddings of (i) each of the plurality of vertices, (ii) the new face token, and (iii) the stopping token, a probability distribution over (i) each of the plurality of vertices, (ii) the new face token, and (iii) the stopping token.

9. The method of claim 8, wherein the auto-regressive mesh generation neural network comprises a face encoder, and wherein generating a respective contextual embedding of (i) each of the plurality of vertices, (ii) a new face token, and (iii) a stopping token comprises:
processing (i) each of the plurality of vertices, (ii) the new face token, and (iii) the stopping token using the face encoder.

10. The method of claim 9, wherein the face encoder has a Transformer architecture.

11. The method of claim 8, wherein the face decoder comprises a plurality of self-attention neural network layers.

12. The method of claim 11, wherein the face decoder applies cross-attention into the contextual embeddings.

13. The method of claim 8, wherein the respective embedding of each mesh token that has been generated at any earlier output positions in the second set is generated based on the contextual embedding for the mesh token.

14. The method of claim 1, wherein generating the probability distribution over possible mesh tokens for the output position comprises masking out logits for any possible mesh tokens for the output position that are not valid given the mesh tokens that have been selected at earlier positions.

15. The method of claim 1, further comprising:
receiving a context input that specifies a context for the three-dimensional mesh; and
wherein the generating comprises, at one or more of the plurality of output positions:
processing an input for the output position using the auto-regressive mesh generation neural network conditioned on (i) at least any mesh tokens that have already been selected at any earlier output positions and (ii) conditioned on the context input to generate a probability distribution over possible mesh tokens for the output position.

16. The method of claim 15, wherein the context input is an input identifying an object class for the object, and wherein conditioning the auto-regressive mesh generation neural network on the context input comprises: generating an embedding of the object class and conditioning the mesh generation neural network on the embedding.

17. The method of claim 15, wherein the context input is an image of the object, and wherein conditioning the auto-regressive mesh generation neural network on the context input comprises: processing the image using an image encoder neural network to generate a sequence of image embeddings and conditioning the mesh generation neural network on the sequence of image embeddings.

18. The method of claim 17, wherein the face decoder applies cross-attention into the sequence of voxel embeddings or the sequence of image embeddings.

19. The method of claim 15, wherein the context input is a set of voxels representing the object, and wherein conditioning the auto-regressive mesh generation neural network on the context input comprises: processing the set of voxels using a voxel encoder neural network to generate a sequence of voxel embeddings and conditioning the mesh generation neural network on the sequence of voxel embeddings.

20. The method of claim 17, wherein the vertex decoder applies cross-attention into the sequence of voxel embeddings or the sequence of image embeddings.

21. One or more non-transitory computer-readable storage media storing instructions that when executed by one or more computers cause the one or more computers to perform operations comprising:
generating, using an auto-regressive mesh generation neural network, an output sequence that specifies vertices and faces of a three-dimensional mesh of an object, the output sequence comprising a respective mesh token at each of a plurality of output positions, wherein:
the output sequence comprises a first set of output positions followed by a second set of output positions,
the mesh tokens at each of the first set of the output positions are respective coordinates of each of a plurality of vertices of the mesh,
the mesh tokens at the second set of output positions are respective coordinates of each of a plurality of faces of the mesh, and wherein the generating comprises,
at each of the first set of output positions:
processing an input for the output position in the first set of output positions using the auto-regressive mesh generation neural network conditioned on at least coordinates of any of the plurality of vertices of the mesh that correspond to mesh tokens that have already been selected at any earlier output positions to generate a probability distribution over possible mesh tokens for the output position, and
selecting, using the probability distribution, the mesh token at the output position in the first set of output positions from the possible mesh tokens for the output position; and
at each of the second set of output positions:
processing an input for the output position in the second set of output positions using the auto-regressive mesh generation neural network conditioned on at least (i) the respective coordinates of each of the plurality of vertices of the mesh corresponding to the mesh tokens at the first set of output positions and (ii) respective coordinates of any faces that correspond to any mesh tokens that have already been selected at any earlier output positions in the second set of output positions to generate a probability distribution over possible mesh tokens for the output position, and
selecting, using the probability distribution, the mesh token at the output position in the second set of output positions from the possible mesh tokens for the output position.

22. A system comprising one or more computers and one or more storage device storing instructions that when executed by the one or more computers cause the one or more computers to perform operations comprising:
generating, using an auto-regressive mesh generation neural network, an output sequence that specifies vertices and faces of a three-dimensional mesh of an object, the output sequence comprising a respective mesh token at each of a plurality of output positions, wherein:
the output sequence comprises a first set of output positions followed by a second set of output positions,
the mesh tokens at each of the first set of the output positions are respective coordinates of each of a plurality of vertices of the mesh,
the mesh tokens at the second set of output positions are respective coordinates of each of a plurality of faces of the mesh, and wherein the generating comprises,
at each of the first set of output positions:
processing an input for the output position in the first set of output positions using the auto-regressive mesh generation neural network conditioned on at least coordinates of any of the plurality of vertices of the mesh that correspond to mesh tokens that have already been selected at any earlier output positions to generate a probability distribution over possible mesh tokens for the output position, and
selecting, using the probability distribution, the mesh token at the output position in the first set of output positions from the possible mesh tokens for the output position; and
at each of the second set of output positions:
processing an input for the output position in the second set of output positions using the auto-regressive mesh generation neural network conditioned on at least (i) the respective coordinates of each of the plurality of vertices of the mesh corresponding to the mesh tokens at the first set of output positions and (ii) respective coordinates of any faces that correspond to any mesh tokens that have already been selected at any earlier output positions in the second set of output positions to generate a probability distribution over possible mesh tokens for the output position, and
selecting, using the probability distribution, the mesh token at the output position in the second set of output positions from the possible mesh tokens for the output position.

23. The system of claim 22, wherein the auto-regressive mesh generation neural network comprises a vertex generation neural network that includes a vertex decoder, and wherein the generating comprises, for each output position in the first set of output positions:
generating a respective embedding for any vertex coordinates that have already been selected at any earlier output positions using a vertex encoder; and
processing the respective embedding using the vertex decoder to generate the probability distribution.

24. The system of claim 22, wherein the auto-regressive mesh generation neural network comprises a face decoder, and wherein the generating comprises:
generating a respective contextual embedding of (i) each of the plurality of vertices, (ii) a new face token, and (iii) a stopping token, wherein the new face token indicates that a face has been completed and the stopping token indicates that generation is terminated; and
at each of the second set of output positions:
generating a decoder input that includes a respective embedding of each mesh token that has been generated at any earlier output positions in the second set;
processing the decoder input using the face decoder to generate a pointer vector; and generating, from the pointer vector and the respective contextual embeddings of (i) each of the plurality of vertices, (ii) the new face token, and (iii) the stopping token, a probability distribution over (i) each of the plurality of vertices, (ii) the new face token, and (iii) the stopping token.

\* \* \* \* \*